(12) United States Patent
Garrison et al.

(10) Patent No.: US 6,714,930 B1
(45) Date of Patent: Mar. 30, 2004

(54) LIGHTWEIGHT DIRECTORY ACCESS PROTOCOL, (LDAP) TRUSTED PROCESSING OF UNIQUE IDENTIFIERS

(75) Inventors: John Michael Garrison, Austin, TX (US); Donna E. Skibbie, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 09/583,409

(22) Filed: May 31, 2000

(51) Int. Cl.[7] .............................................. G06F 17/30
(52) U.S. Cl. ................... 707/9; 707/3; 707/10; 709/203; 709/206; 709/219; 709/225; 709/229
(58) Field of Search .................. 707/9, 10, 3, 4; 713/170, 201; 714/42; 709/206, 207, 223, 225, 229, 203, 219

(56) References Cited

U.S. PATENT DOCUMENTS

| | | | |
|---|---|---|---|
| 4,525,780 A | | 6/1985 | Bratt et al. ................... 711/163 |
| 4,858,117 A | | 8/1989 | DiChiara et al. ............. 364/200 |
| 4,945,468 A | | 7/1990 | Carson et al. ................ 364/200 |
| 5,235,642 A | | 8/1993 | Wobber et al. ................ 380/25 |
| 5,335,346 A | | 8/1994 | Fabbio ......................... 395/600 |
| 5,485,409 A | | 1/1996 | Gupta et al. .................. 395/186 |
| 5,530,758 A | | 6/1996 | Marino, Jr. et al. ........... 380/49 |
| 5,664,098 A | | 9/1997 | Bianchi et al. ............... 395/186 |
| 5,717,756 A | | 2/1998 | Coleman ....................... 380/25 |
| 5,825,877 A | | 10/1998 | Dan et al. ........................ 380/4 |
| 5,881,229 A | * | 3/1999 | Singh et al. .................. 709/203 |
| 5,898,780 A | | 4/1999 | Liu et al. ........................ 380/25 |
| 5,903,721 A | | 5/1999 | Sixtus ....................... 395/187.01 |
| 5,922,074 A | | 7/1999 | Richard et al. ................ 713/200 |
| 5,953,422 A | | 9/1999 | Angelo et al. ................. 380/23 |
| 6,023,765 A | | 2/2000 | Kuhn ............................ 713/200 |
| 6,052,681 A | * | 4/2000 | Harvey ............................ 707/3 |
| 6,098,099 A | * | 8/2000 | Ellesson et al. ............. 709/223 |
| 6,101,539 A | * | 8/2000 | Kennelly et al. ............. 709/223 |
| 6,170,009 B1 | * | 1/2001 | Mandal et al. ............... 709/223 |
| 6,182,142 B1 | * | 1/2001 | Win et al. ..................... 709/219 |
| 6,263,367 B1 | * | 7/2001 | Chu et al. .................... 709/223 |
| 6,324,648 B1 | * | 11/2001 | Grantges, Jr. ............... 709/229 |
| 6,330,560 B1 | * | 12/2001 | Harrison et al. ................ 707/8 |
| 6,330,677 B1 | * | 12/2001 | Madoukh ..................... 713/200 |
| 6,347,312 B1 | * | 2/2002 | Byrne et al. .................... 707/3 |
| 6,356,892 B1 | * | 3/2002 | Corn et al. ............. 707/103 R |
| 6,366,950 B1 | * | 4/2002 | Scheussler et al. ......... 709/206 |
| 6,374,359 B1 | * | 4/2002 | Shrader et al. .............. 709/229 |
| 6,426,955 B1 | * | 7/2002 | Gossett Dalton, Jr. et al. ......... 370/401 |
| 6,438,549 B1 | * | 8/2002 | Aldred et al. ................... 707/9 |
| 6,553,368 B2 | * | 4/2003 | Martin et al. ................... 707/3 |
| 6,553,384 B1 | * | 4/2003 | Frey et al. ............. 707/103 R |
| 2002/0087718 A1 | * | 7/2002 | Hill et al. .................... 709/237 |

FOREIGN PATENT DOCUMENTS

JP      10-078930      3/1998

* cited by examiner

Primary Examiner—Jean R. Homere
Assistant Examiner—Leslie Wong
(74) Attorney, Agent, or Firm—Jeffrey S. LaBaw; Joseph R. Burwell; David Judson

(57) ABSTRACT

A trusted process for use with a hierarchical directory service such as LDAP for enabling different security systems to store and retrieve unique identifiers that are shared or common to the entire directory. The trusted process allows LDAP users to store and to retrieve unique identifiers on LDAP using standard LDAP interfaces. It also allows security systems to share unique identifier information. The trusted process generates or verifies a unique identifier, guarantees the uniqueness of a unique identifier within the entire directory (rather than just within a single security system), and guarantees that any unique identifier returned to an LDAP user is a trusted unique identifier.

21 Claims, 3 Drawing Sheets

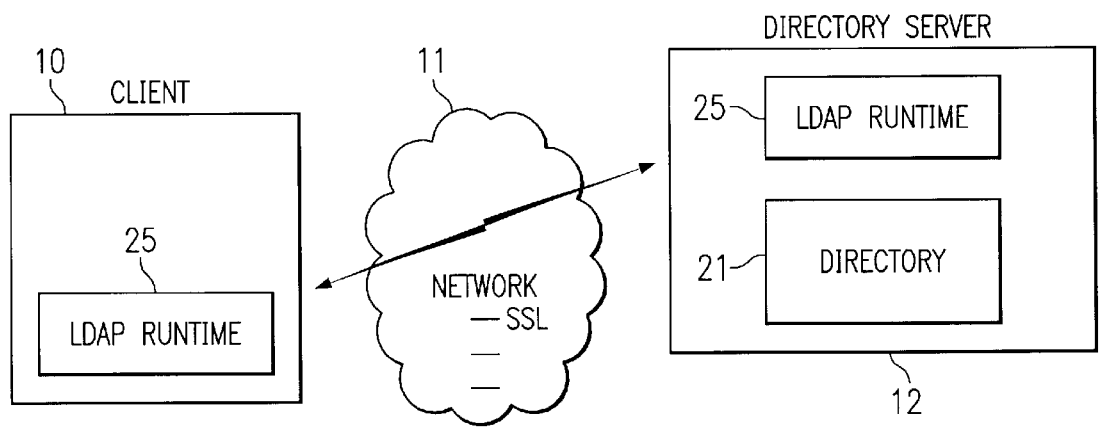
FIG. 1
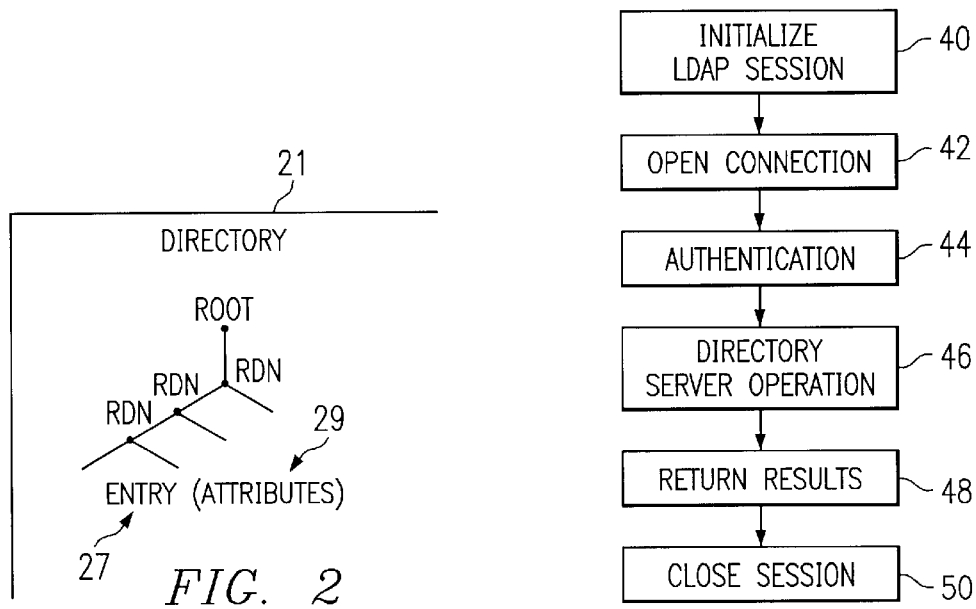
FIG. 2
FIG. 3
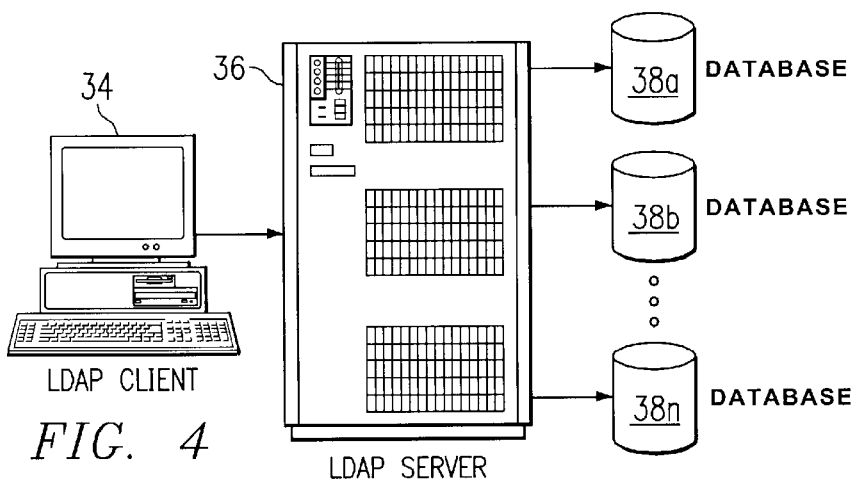
FIG. 4

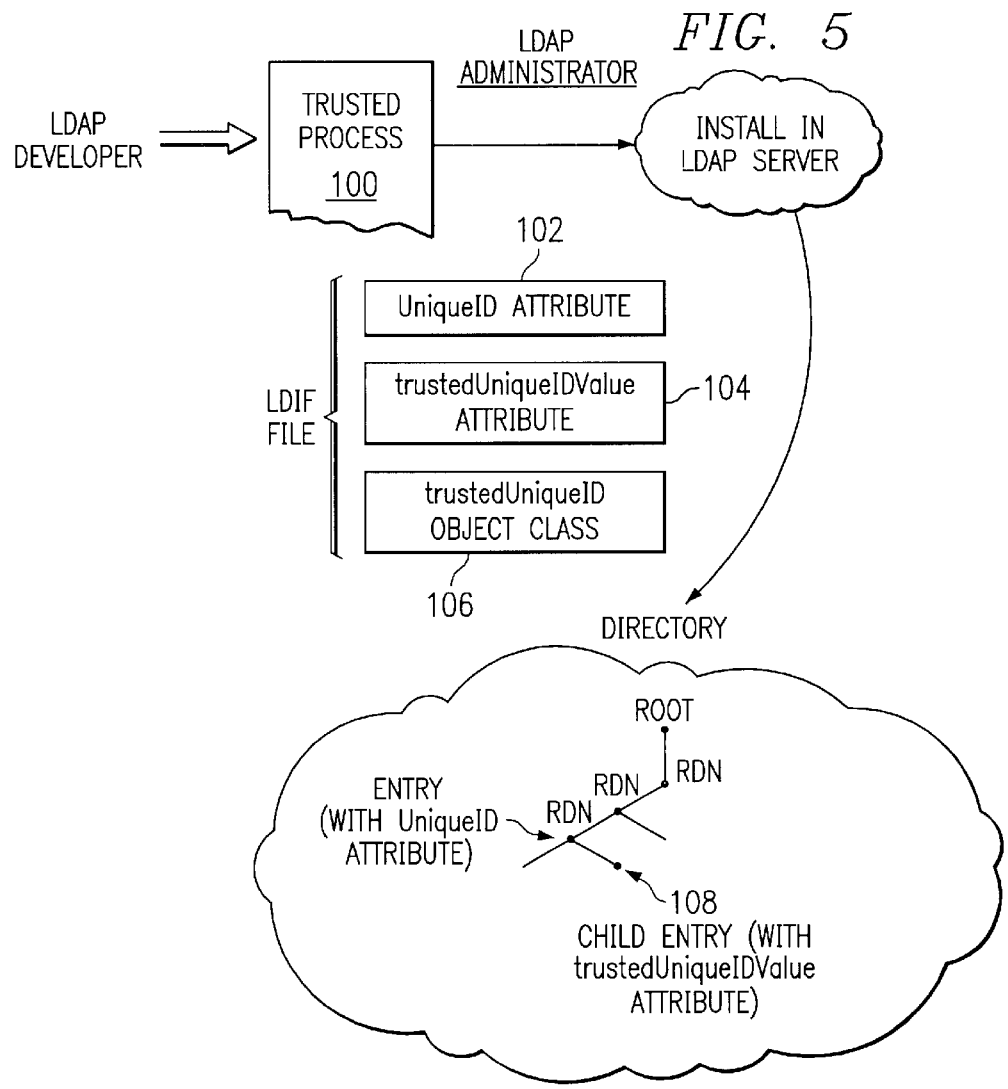

LIGHTWEIGHT DIRECTORY ACCESS PROTOCOL, (LDAP) TRUSTED PROCESSING OF UNIQUE IDENTIFIERS

BACKGROUND OF THE INVENTION

1. Technical Field

This invention relates generally to providing directory services in a distributed computing environment.

2. Description of the Related Art

A directory service is the central point where network services, security services and applications can form an integrated distributed computing environment. Typical uses of a directory services may be classified into several categories. A "naming service" (e.g., DNS and DCE Cell Directory Service (CDS)) uses the directory as a source to locate an Internet host address or the location of a given server. A "user registry" (e.g., Novell NDS) stores information about users in a system composed of a number of interconnected machines. The central repository of user information enables a system administrator to administer the distributed system as a single system image. Still another directory service is a "white pages" lookup provided by some e-mail clients, e.g., Netscape Communicator, Lotus Notes, Endora and the like).

With more and more applications and system services demanding a central information repository, the next generation directory service will need to provide system administrators with a data repository that can significantly ease administrative burdens. In addition, the future directory service must also provide end users with a rich information data warehouse that allows them to access department or company employee data, as well as resource information, such as name and location of printers, copy machines, and other environment resources. In the Internet/intranet environment, it will be required to provide user access to such information in a secure manner.

To this end, the Lightweight Directory Access Protocol (LDAP) has emerged as an IETF open standard to provide directory services to applications ranging from e-mail systems to distributed system management tools. LDAP is an evolving protocol that is based on a client-server model in which a client makes a TCP/IP connection to an LDAP server, sends requests, and receives responses. The LDAP information model in particular is based on an "entry," which contains information about some object. Entries are typically organized in a specified tree structure, and each entry is composed of attributes.

LDAP provides a number of known functions including query (search and compare), update, authentication and others. The search and compare operations are used to retrieve information from the database. For the search function, the criteria of the search is specified in a search filter. The search filter typically is a Boolean expression that consists of qualifiers including attribute name, attribute value and Boolean operators like AND, OR and NOT. Users can use the filter to perform complex search operations. One filter syntax is defined in RFC 2254.

LDAP thus provides the capability for directory information to be efficiently queried or updated. It offers a rich set of searching capabilities with which users can put together complex queries to get desired information from a backing store. Increasingly, it has become desirable to use a relational database for storing LDAP directory data. Representative database implementations include DB/2, Oracle, Sybase, Informix and the like. As is well known, Structured Query Language (SQL) is the standard language used to access such databases.

Many security systems are moving their databases to LDAP with the expectation that they can share common attributes, such as unique identifiers. A unique identifier is an identifier code (e.g., a number with many digits) that is guaranteed to be unique within the database of a security system. Unique identifiers are used to facilitate access control decisions. When an administrator adds a user or group to the security system, the security system typically generates a unique identifier or verifies that a unique identifier supplied by the administrator is unique, stores the unique identifier in the security system database, and protects the unique identifier so that it can never be modified.

LDAP, however, does not provide any mechanism to generate, verify, and protect a unique identifier. Therefore, each security system must store its own set of unique identifiers on LDAP, protect these unique identifiers so they cannot be modified, and take elaborate precautions to ensure that LDAP users do not attempt to fool the system by creating their own unique identifier information. The present invention overcomes this deficiency of the prior art.

BRIEF SUMMARY OF THE INVENTION

The present invention defines a trusted process for use with a hierarchical directory service such as LDAP for enabling different security systems to store and retrieve unique identifiers that are shared or common to the entire directory. The trusted process allows LDAP users to store and to retrieve unique identifiers on LDAP using standard LDAP interfaces. It also allows security systems to share unique identifier information. The trusted process generates or verifies a unique identifier, guarantees the uniqueness of a unique identifier within the entire directory (rather than just within a single security system), and guarantees that any unique identifier returned to an LDAP user is a trusted unique identifier.

According to one aspect of the invention, a computer-implemented method is provided for configuring a unique identifier that may be shared by a plurality of users of a hierarchical directory such as LDAP. The method begins by intercepting a call from the LDAP administrator to a unique identifier attribute. The method then verifies that any unique identifier specified in the call is unique to the directory. If the call does not include a unique identifier, one is generated. Upon verification or generation of the unique identifier, as the case may be, the unique identifier is stored in a trusted unique identifier attribute of an entry of an object class in the directory. An access control is then set on the entry so that it cannot be modified. Although the unique identifier is actually stored in the trusted unique identifier attribute, the users of the unique identifier are notified that the unique identifier can be retrieved by making LDAP calls to the unique identifier attribute.

According to another aspect of the invention, a computer-implemented method is also provided for managing calls to the unique identifier attribute. When such calls are made, they are intercepted and then processed to retrieve the unique identifier from the trusted unique identifier attribute. In particular, the routine first verifies that a trusted process created an entry of a given object class that contains the trusted unique identifier attribute. Upon verification, the unique identifier is retrieved from the trusted unique identifier attribute (as opposed to the unique identifier attribute) and returned to the calling entity.

The present invention may be implemented in a computer program product useable in an LDAP directory service. The product comprises object class that contains a trusted unique identifier attribute used to store a unique identifier, and a trusted process. The trusted process includes code for creating a child entry of the object class, code for storing the unique identifier in the trusted unique identifier attribute, code for setting an access control on the child entry so that the child entry cannot be modified, and code for intercepting calls to a unique identifier attribute and processing such calls using the trusted unique identifier attribute.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative LDAP directory service implementation;

FIG. 2 is a simplified LDAP directory;

FIG. 3 is a flowchart of an LDAP directory session;

FIG. 4 is a representative LDAP directory service implementation having a relational database backing store;

FIG. 5 illustrates a trusted process and how it is used according to the present invention;

FIG. 6 illustrates a portion of the LDAP directory showing the uniqueID attribute and trustedUniqueIDValue attribute of the present invention;

DETAILED DESCRIPTION OF THE PREFERRED EMBODIMENT

Figure 7:
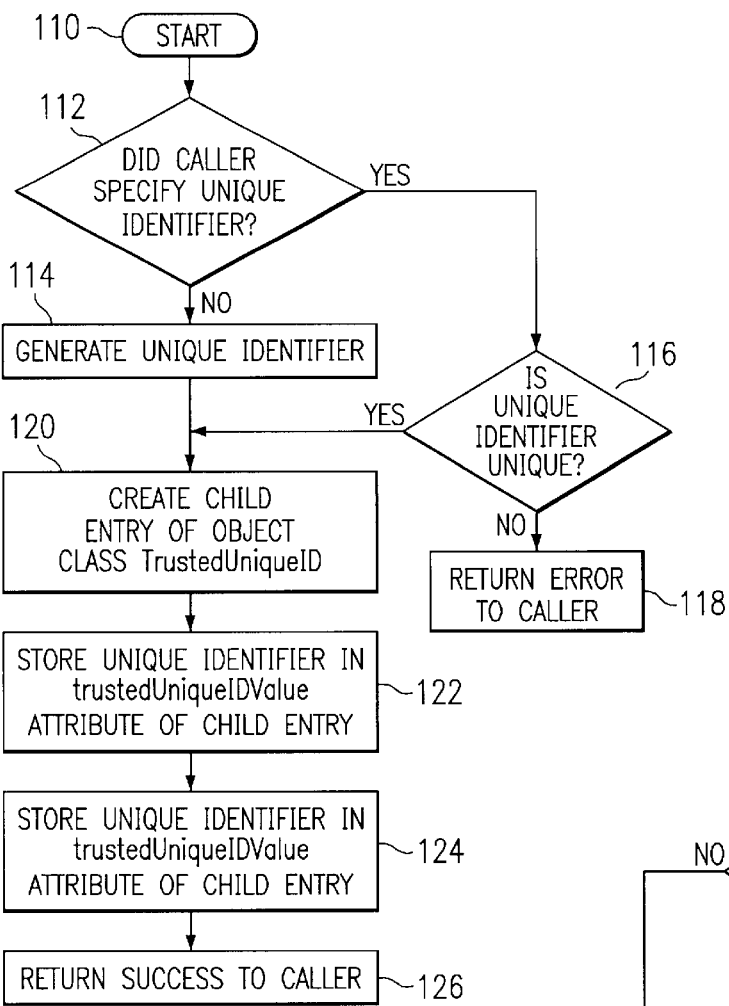
FIG. 7 illustrates how the trusted process of the present invention processes an LDAP call to write to a uniqueID attribute.

A block diagram of a representative LDAP directory service in which the present invention may be implemented is shown in FIG. 1. As is well-known, LDAP is the lightweight directory access protocol, and this protocol has been implemented in the prior art, e.g., as either a front end to the X.500 directory service, or as a standalone directory service. According to the protocol, a client machine 10 makes a TCP/IP connection to an LDAP server 12, sends requests and receives responses. LDAP server 12 supports a directory 21 as illustrated in a simplified form in FIG. 2. Each of the client and server machines further include a directory runtime component 25 for implementing the directory service operations as will be described below. The directory 21 is based on the concept of an "entry" 27, which contains information about some object (e.g., a person). Entries are composed of attributes 29, which have a type and one or more values. Each attribute 29 has a particular syntax that determines what kinds of values are allowed in the attribute (e.g., ASCII characters, .jpeg file, etc.) and how these values are constrained during a particular directory operation. Entries are stored in a given table (e.g., ldap_entry) that includes entry IDs, parent IDs, a create and last modified timestamp, together with the complete entry in string format. Each attribute has an associated attribute table.

The directory tree is organized in a predetermined manner, with each entry uniquely named relative to its sibling entries by a "relative distinguished name" (RDN). An RDN comprises at least one distinguished attribute value from the entry and, at most, one value from each attribute is used in the RDN. According to the protocol, a globally unique name for an entry, referred to as a "distinguished name" (DN), comprises a concatenation of the RDN sequence from a given entry to the tree root.

The LDAP search can be applied to a single entry (a base level search), an entry's children (a one level search), or an entire subtree (a subtree search). Thus, the scope supported by LDAP search are: base, one level and subtree. LDAP does not support search for arbitrary tree levels and path enumeration.

LDAP includes an application programming interface (API), as described in "The C LDAP Application Program Interface", IETF Working Draft, Jul. 29, 1997, which is incorporated herein by reference. An application on a given client machine uses the LDAP API to effect a directory service "session" according to the flowchart of FIG. 3. At step 40, an LDAP session with a default LDAP server is initialized. At step 42, an API function ldap_init( ) returns a handle to the client, and this handle may allow multiple connections to be open at one time. At step 44, the client authenticates to the LDAP server using, for example, an API ldap_bind( ) function. At step 46, one or more LDAP operations are performed. For example, the API function ldap_search( ) may be used to perform a given directory search. At step 48, the LDAP server returns the results of the directory search, e.g., one or more database elements that meet the search criteria. The session is then closed at step 50 with the API ldap_unbind( ) function then being used to close the connection.

It may be desirable to store LDAP directory data in a backing store. FIG. 4 illustrates a representative LDAP directory service implementation that uses a relational database management system (RDBMS) for this purpose. This system merely illustrates a possible LDAP directory service in which the present invention may be implemented. One of ordinary skill should appreciate, however, that the invention is not limited to an LDAP directory service provided with a DB/2 backing store. The principles of the present invention may be practiced in other types of directory services (e.g., X.500) and using other relational database management systems (e.g., Oracle, Sybase, Informix, and the like) as the backing store.

In FIG. 4, an LDAP client 34 can connect to a number of networked databases 38a–38n through an LDAP server 36. The databases 38a–38n contain the directory information. However, from the user's perspective, the LDAP server 36 stores all the information without knowing the database 38 in which the data is actually located. With this configuration, the LDAP server 36 is freed from managing the physical data storage and is able to retrieve information from multiple database servers 38 which work together to form a huge data storage.

The present invention is now described. To simplify the description, the following assumes that no existing security databases need to be migrated to LDAP and that unique identifiers need to be configured only for a relatively small number of people. Of course, this is not a limitation of the present invention.

According to the present invention, the directory service is augmented with a trusted process that is used to store and retrieve unique identifiers. The process is "trusted" in the sense that the developers of such code have adhered to stringent security standards in developing the code. The process allows LDAP users to store and retrieve unique identifiers on LDAP using standard LDAP interfaces. It also allows security systems to share unique identifier information. The trusted process functions generally to create or verify a unique identifier, to guarantee the uniqueness of a unique identifier within the entire directory, and guarantees that any unique identifier returned to an LDAP user is a trusted unique identifier.

To define the trusted process, the present invention preferably makes use of two features in the LDAP Version 3 protocol. The first feature makes it possible for a developer to provide LDAP backend code that will process an attribute defined by the developer. To this end, a developer defines an LDAP uniqueID attribute and then installs and configures LDAP backend code (referred to as a trusted process) that will process the uniqueID attribute. The second feature makes it possible to obtain the identity of the creator of an LDAP entry. The trusted process determines whether the LDAP entry storing the actual unique identifier value is a trusted entry (an entry that was created by itself or another trusted process) or an untrusted entry (an entry created by some other identity). These features of the invention will now be described in detail.

With reference now to FIG. 5, the trusted process developer begins by providing the LDAP administrator (or other entity) with LDAP backend code, referred to herein as a "trusted process" 100. As will be seen, the trusted process 100 is responsible for processing all LDAP calls to a uniqueID attribute. The trusted process developer also provides the LDAP administrator with a file (e.g., an LDIF file) defining two attributes 102 and 104, and one object class 106. In particular, attribute 102 is referred to herein as uniqueID, and attribute 104 is referred to as trustedUniqueIDValue. From the point of view of the LDAP user, uniqueID attribute 102 stores the unique identifier. However, as will be seen, all LDAP calls to this attribute are processed by the trusted process 100. The trusted process 100 actually stores the unique identifier in the trustedUniqueIDValue attribute 104 of a child entry 108 (an entry residing under the entry with the uniqueID attribute). The child entry 108 is trusted only if it was created by a trusted process 100. When the trusted process creates the child entry 108, it sets the access control lists (ACLs) on this entry so that they entry cannot be modified. According to the invention, the trustedUniqueIDValue attribute 104 (and not the uniqueID attribute) is used by the trusted process 100 to store and retrieve the unique identifier. It resides in an entry that is created by a trusted process, that contains the trustedUniqueID object class 106, and that resides under the entry containing the uniqueID attribute 102. The trustedUniqueID object class 106 is used to create the child entry (the entry under the entry with the uniqueID attribute 102) that contains the trustedUniqueIDValue attribute 104.

The LDAP administrator installs the trusted process and LDIF file that were provided to the administrator by the trusted process developer. The administrator may decide on a common place in the schema to configure the uniqueID attribute. For example, the administrator may decide to configure the uniqueID attribute for each person in the entry representing the person, although this is not a requirement of the invention. The LDAP administrator also configures the uniqueID attribute 102 for each person in the enterprise. To configure the uniqueID attribute, the administrator issues a standard LDAP call to the uniqueID attribute and optionally specifies a unique identifier value. The trusted process intercepts the call and processes it as follows (and as illustrated in FIG. 7). If the caller (namely, the administrator) specified a unique identifier, the trusted process verifies that it is unique with the directory; otherwise, the process generates a unique identifier that is unique with LDAP. It then creates a child entry (an entry under the entry with the uniqueID attribute) that is of object class trustedUniqueID. It then stores the unique identifier in the trustedUniqueIDValue attribute of the child entry and sets the ACLs on the child entry so that the entry cannot be modified.

FIG. 6 illustrates a portion 105 of the directory and, in particular, the uniqueID attribute 102, which is what the LDAP user uses to access the unique identifier. The portion 107 of the directory illustrates that the trusted process actually stores and retrieves the unique identifier using the trustedUniqueIDValue attribute 104. As described above, this entry is created by the trusted process, and ACLs are set on this entry so that the entry cannot be modified.

The LDAP administrator then informs the developers of all security systems in the enterprise that they need to retrieve unique identifiers from the uniqueID attribute and that they can use standard LDAP calls to retrieve this attribute. The LDAP administrator also ensures the developers that the uniqueID attribute is processed by a trusted process and guaranteed to store a unique identifier values that are unique within the enterprise.

The developer of each security system in the enterprise modifies the security system so that it retrieves unique identifier values from the uniqueID attributes configured by the LDAP administrator. To retrieve a unique identifier, the developer issues a standard LDAP call to the uniqueID attribute. The trusted process intercepts this call and processes it as follows (and as described in FIG. 8). It finds a child entry that is of object class trustedUniqueID and that contains a trustedUniqueIDValue attribute. It then verifies the creator of the child entry was a trusted process and retrieves the unique identifer value from the trustedUniqueIDValue attribute. This value is then returned to the caller.

FIG. 7 illustrates how the trusted process processes an LDAP call to write to a uniqueID attribute. The routine begins at step 110 when the trusted process gets the LDAP call. At step 112, the trusted process tests to determine whether the caller specified a unique identifier. If not, the routine branches to step 114, wherein the trusted process generates a unique identifier that is unique within the directory (i.e. no trustedUniqueIDValue attribute exists on the directory with the same unique identifier value). If, however, the outcome of the test at step 112 is positive, the trusted process executes a test at step 116 to verify whether this unique identifier is unique within the directory. If not, the trusted process returns an error message to the caller at step 118. Following step 114, or if the outcome of the test at step 116 is positive, the routine continues at step 120 with the trusted process creating a child entry of the TrustedUniqueID object class. At step 122, the trusted process stores the unique identifier in the trustedUniqueIDValue attribute of the child entry. At step 124, the trusted process sets the access control lists (ACLs) on the child entry so that the entry cannot be modified. The routine then returns successful at step 126 to complete the process.

Figure 8:
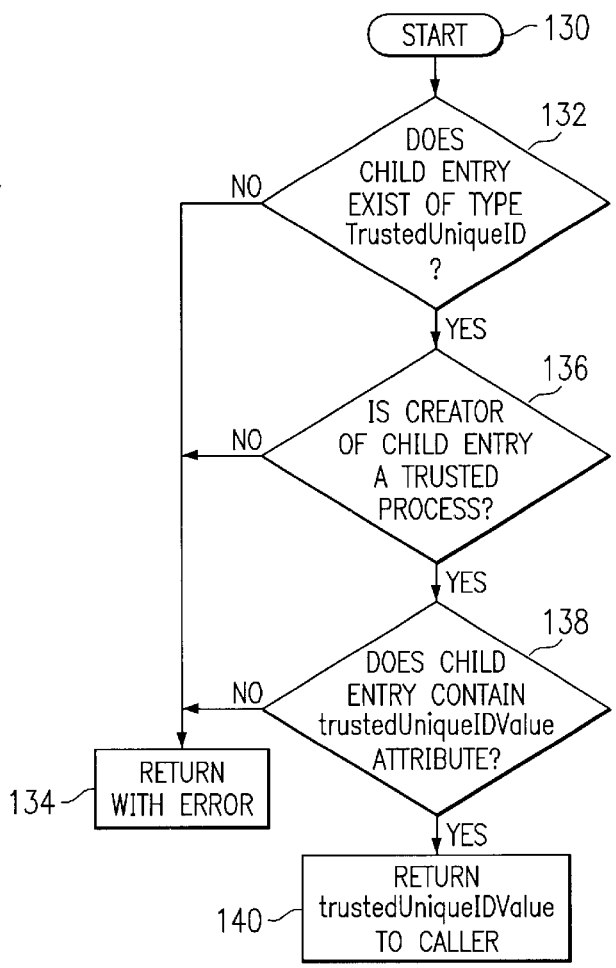
FIG. 8 illustrates how the trusted process processes an LDAP call to retrieve a uniqueID attribute.

FIG. 8 is a flowchart illustrating how the trusted process processes an LDAP call to retrieve a uniqueID attribute. The routine begins at step 130 when then trusted process gets the LDAP call. At step 132, trusted process performs a test to determine whether a child entry exists that is of the type TrustedUniqueID. If not, an error is returned at step 134. If, however, the outcome of the test at step 132 is positive, the routine continues at step 136 wherein the trusted process determines whether the creator of the child entry was a trusted process. If the outcome of the test at step 136 is negative, an error message is returned at step 134. If, however, the creator of the child entry was a trusted process, the routine continues at step 138 wherein the trusted process tests whether the child entry contains a trustedUniqueIDValue attribute. If not, an error message is returned at step 134. If, however, the outcome of the test at step 138 is positive, the trusted process continues at step 140 to return the value of trustedUniqueIDValue to the caller. This completes the processing.

The present invention provides numerous advantages. It enables security systems to port their databases to LDAP without having to store their own sets of unique identifiers. With the present invention, security systems can share unique identifiers or other common attributes of interest. For example, assume that there are two security systems, one based on The Open Group DCE and a second system based on IBM® Policy Director. Using the invention, the LDAP administrator would configure one set of unique identifiers for people and groups, and these unique identifiers would be used by both security systems. More specifically, the administrator would create a unique identifier for each person by configuring a uniqueID attribute in the person entry. The administrator would create a uniqueID for each group by configuring a uniqueID attribute in the group entry. In both cases, the unique identifier actually would be stored in the trustedUniqueIDValue attribute of the child entry as described above. DCE and Policy Director, as the case may be, would then used the uniqueID in the person entry to retrieve a unique identifier for a person, and the unique identifier in the group entry to retrieve the unique identifier of a group. As a consequence, one of ordinary skill will appreciate that each individual security systems need no longer store its own set of unique identifiers and/or protect such identifiers against modification as has been required in the prior art. Rather, the trusted process enables the creation and storage of "global" unique identifiers that can be used across the entire directory service.

Moreover, although the preferred embodiment has been described in the context of creating and using global unique identifiers in LDAP, the inventive technique should be broadly construed to extend to any hierarchical directory such as in an X.500 directory service or hereinafter-developed LDAP implementations. Generalizing, the present invention is may be implemented in conjunction with any higher level directory structure in which information is spread out over a set of tables.

The trusted process may be implemented as a plug-in to the LDAP server. Alternatively, the process may comprise part of the LDAP server code. It also may be provided as an application service. Generalizing, the trusted process is a set of instructions (e.g., computer program code) in a code module resident in or downloadable to the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

One of ordinary skill in the art should also appreciate that the "unique identifier" as described in this application and as recited in the claims should be construed broadly to cover any sensitive information stored on LDAP that may require the intervention of a trusted process for storing/retrieving the information.

Having thus described our invention, what we claim as new and desire to secure by letters patent is set forth in the following claims:

What is claimed is:

1. A computer-implemented method of configuring a unique identifier that may be shared by a plurality of users of a hierarchical directory, the method comprising:

intercepting a call to access a unique identifier attribute of an entry in the hierarchical directory;

in response to intercepting a call, verifying that a unique identifier specified in the call is unique to the hierarchical directory;

if the unique identifier specified in the call is unique to the hierarchical directory, storing the unique identifier in a trusted unique identifier attribute of the entry in the hierarchical directory; and setting an access control on the entry so that the entry cannot be modified.

2. The method as described in claim 1 further including the step of generating a unique identifier if the call does not specify any such unique identifier.

3. The method as described in claim 1 wherein the entry is a child entry of an object class used to create the child entry.

4. The method as described in claim 3 wherein the child entry is under an entry having the unique identifier attribute.

5. The method as described in claim 1 wherein the hierarchical directory is LDAP.

6. The method as described in claim 1 further including the step of issuing a notification that the unique identifier may be obtained by issuing calls to the unique identifier attribute.

7. The method as described in claim 1 further including the step of restricting access to the trusted unique identifier attribute except by a given process.

8. The method as described in claim 7 wherein the given process verifies the unique identifier and stores the unique identifier in the trusted unique identifier attribute.

9. The method as described in claim 1 wherein the access control is a set of access control lists (ACLs).

10. A computer-implemented method of managing a unique identifier that may be shared by a plurality of users of an LDAP directory, comprising:

storing a unique identifier in a trusted unique identifier attribute of an entry in the LDAP directory;

setting an access control so that the trusted unique identifier attribute cannot be modified; and notifying users of the LDAP directory that the unique identifier can be obtained by issuing calls to a unique identifier attribute.

11. The method as described in claim 10 further including the steps of:
   intercepting a call to access the unique identifier attribute;
   in response to intercepting a call, verifying that a trusted process created an entry or a given object class that contains the trusted unique identifier attribute; and
   upon verification, retrieving the unique identifier from the trusted unique identifier attribute.

12. The method as described in claim 11 further including the step of returning the unique identifier to an entity that issued the call.

13. A computer-implemented method of retrieving a unique identifier that may be shared by a plurality of users of an LDAP directory, comprising:
   intercepting a call to access a unique identifier attribute of an entry in the hierarchical directory;
   in response to intercepting a call, verifying that a trusted process created an entry of a given object class that contains a trusted unique identifier attribute;
   upon verification, retrieving the unique identifier from the trusted unique identifier attribute; and
   returning the unique identifier to an entity that issued the call.

14. A computer program product useable in an LDAP directory service, comprising:
   an object class that contains a trusted unique identifier attribute used to store a unique identifier; and
   a trusted process for creating a child entry of the object class, for storing the unique identifier in the trusted unique identifier attribute, for setting an access control on the child entry so that the child entry cannot be modified, and for intercepting and processing calls to access a unique identifier attribute.

15. The computer program product as described in claim 14 wherein the trusted process processes calls by returning the unique identifier retrieved from the trusted unique identifier attribute.

16. The computer program product as described in claim 14 wherein the access control is a set of access control lists (ACLs).

17. The computer program product as described in claim 14 wherein the child entry is under an entry having the unique identifier attribute.

18. A computer program product in a computer-useable medium for use in an LDAP directory service, comprising:
   code for storing a unique identifier in an entry of an object class having a trusted unique identifier attribute;
   code for setting an access control so that the trusted unique identifier attribute cannot be modified; and
   code for intercepting a call to access a unique identifier attribute and retrieving the unique identifier from the trusted unique identifier attribute.

19. The computer program product as described in claim 18 wherein the code for intercepting includes:
   code for verifying that the entry of the object class contains the trusted unique identifier attribute.

20. The computer program product as described in claim 18 wherein the entry is under an entry having the unique identifier attribute.

21. An LDAP directory service, comprising:
   an LDAP directory;
   an object class that contains a trusted unique identifier attribute used to store a unique identifier; and
   a trusted process for creating a child entry of the object class in the LDAP directory, for storing the unique identifier in the trusted unique identifier attribute, for setting an access control on the child entry so that the child entry cannot be modified, and for intercepting calls to access a unique identifier attribute and, in response, returning the unique identifier retrieved from the trusted unique identifier attribute.

* * * * *